US007498080B2

(12) United States Patent
Tung et al.

(10) Patent No.: US 7,498,080 B2
(45) Date of Patent: Mar. 3, 2009

(54) FERROMAGNETIC POWDER FOR DUST CORE

(75) Inventors: Chao-Nien Tung, Guangdong (CN); Chuen-Shu Hou, Guangdong (CN); Chih-Hao Yang, Guangdong (CN); Lung-Wei Huang, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 394 days.

(21) Appl. No.: 11/308,530

(22) Filed: Apr. 3, 2006

(65) Prior Publication Data

US 2006/0280944 A1 Dec. 14, 2006

(30) Foreign Application Priority Data

Jun. 10, 2005 (CN) ........................ 2005 1 0035296

(51) Int. Cl.
*B32B 5/66* (2006.01)

(52) U.S. Cl. ........................ 428/402; 428/403; 428/404; 428/405; 428/406; 428/407; 428/357; 428/689; 427/216; 427/217; 419/35; 419/56; 419/57

(58) Field of Classification Search ................. 428/402, 428/403, 357, 689, 404, 405, 406, 407; 419/35, 419/56, 57; 427/216, 217
See application file for complete search history.

(56) References Cited

U.S. PATENT DOCUMENTS

| | | | | |
|---|---|---|---|---|
| 4,601,765 | A * | 7/1986 | Soileau et al. | 148/104 |
| 5,227,235 | A * | 7/1993 | Moro et al. | 428/357 |
| 5,767,426 | A * | 6/1998 | Oliver et al. | 75/246 |
| 6,149,704 | A * | 11/2000 | Moro et al. | 75/230 |
| 6,527,823 | B2 * | 3/2003 | Moro | 75/246 |

* cited by examiner

*Primary Examiner*—Leszek Kiliman
(74) *Attorney, Agent, or Firm*—Winston Hsu

(57) ABSTRACT

A particle (10) of ferromagnetic powder for use in preparation of soft magnetic core components has a core-shell structure. The particle includes a central core (12) and a shell (14) coated on the central core. The central core is made of magnetic material and is used for providing the necessary magnetic property for the magnetic core components made from the ferromagnetic powder. The shell has a higher electrical resistance than the central core so as to reduce an eddy current loss of the magnetic core component. The shell also functions to provide an excellent bonding strength between particles of the powder.

11 Claims, 3 Drawing Sheets

FERROMAGNETIC POWDER FOR DUST CORE

CROSS-REFERENCES TO RELATED APPLICATION

Relevant subject matter is disclosed in two copending U.S. patent application filed on the same date and each having a title "motor stator", which are assigned to the same assignee with the present application.

FIELD OF THE INVENTION

The present invention relates generally to soft magnetic materials, and more particularly to ferromagnetic powders used for producing soft magnetic core components for use as a dust core for a motor, inductor, transformer, generator or the like.

DESCRIPTION OF RELATED ART

Magnetic material includes hard magnetic material (Hc>200 Oe) and soft magnetic material (Hc<20 Oe), wherein the former can be permanently magnetized while the latter can be easily magnetized and demagnetized at an applied, relatively low magnetic field. Particularly, soft magnetic material has a high magnetic permeability and the magnetization thereof can be reversed easily at an applied field. The permeability of a magnetic material is an indication of its ability to become magnetized or its ability to carry a magnetic flux. Currently, soft magnetic material is widely used as material for producing the dust core for an electric/magnetic conversion device such as motors, generators, transformers, inductors and the like.

Some soft magnetic cores, such as rotors and stators in electric machines, are made of stacked steel laminations. For example, in a fan motor, silicon steel laminations have been used for decades as constituting the stator core of the fan motor. The silicon steel laminations, which are usually made from soft magnetic Fe—Si alloy via hot rolling, have an eddy current loss that is proportional to the square of the thickness of the laminations. The eddy current loss is brought about by the production of electric currents in the magnetic core component due to the changing flux caused by an alternating magnetic field. Thus, the laminations are expected to have a thickness as small as possible in order to reduce the eddy current loss problem. However, since the hot rolling technique requires each of the laminations to have a minimum thickness, and laminations with an excessively thin structure are prone to deformation during assembly, the laminations often are selected to have a thickness which is typically restricted at 0.20 mm, 0.35 mm or 0.50 mm. Furthermore, the shape of the stator core made from laminated steel sheets is also unduly limited. Certain three-dimensional configurations are very difficult and expensive to achieve with the silicon steel laminations.

Therefore, it is desirable to provide a soft magnetic material suited for the production of a dust core wherein one or more of the foregoing disadvantages may be overcome or at least alleviated.

SUMMARY OF INVENTION

The present invention relates to ferromagnetic powder for use in manufacturing of soft magnetic core components. A particle of the ferromagnetic powder has a core-shell structure, which includes a central core and a shell coated on the central core. The central core is made of magnetic material and is used for providing the necessary magnetic property for the magnetic core component made from the ferromagnetic powder. The shell has a higher electrical resistance than the central core and is used for providing a bonding strength between particles of the powder and for reducing an eddy current loss of the magnetic core component.

Other advantages and novel features of the present invention will become more apparent from the following detailed description of preferred embodiment when taken in conjunction with the accompanying drawings, in which:

DETAILED DESCRIPTION

Figure 1:
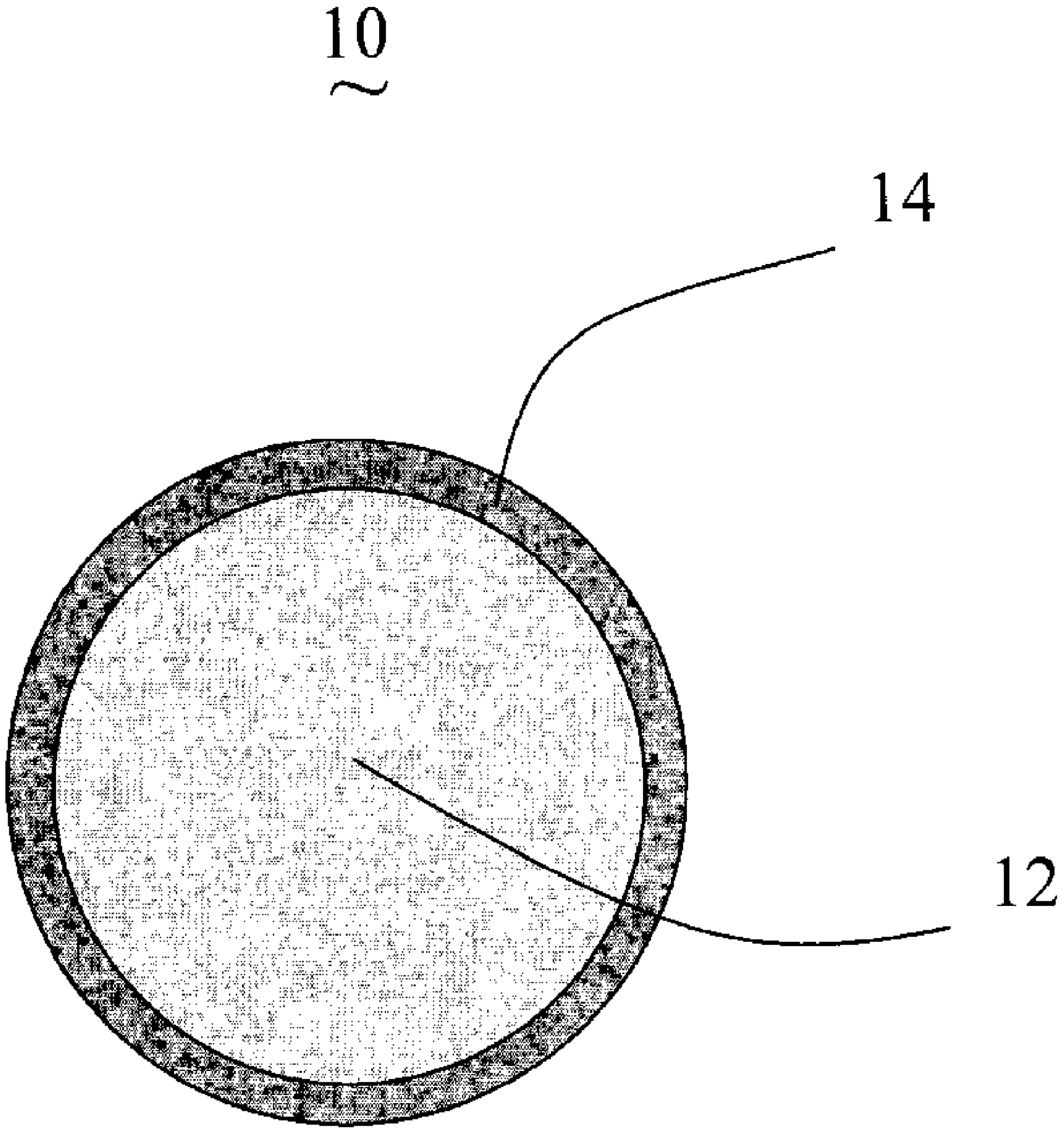
FIG. 1 is a schematic representation of a particle of the ferromagnetic powder in accordance with an embodiment of the present invention.

FIG. 1 schematically illustrates a particle 10 of the ferromagnetic powder in accordance with an embodiment of the present invention. The particle 10 has a core-shell structure, which includes an inner core 12 made of magnetic material and an outer shell 14 covering the core 12. The shell 14 is a thin insulating layer coated on an outer peripheral surface of the core 12. The shape of the particle 10 is subject to no limitations, which may be spherical, flat or other suitable shapes. When the particle 10 is spherical, an average diameter of the particle 10 is from 5 to 150 μm.

The magnetic material used for the core 12 is typically selected from a soft magnetic material of high magnetic permeability and low magnetic loss, such as soft magnetic metals, amorphous iron-based magnetic powder, pure iron powder, iron-based powder compositions, soft magnetic non-metals and the like. For example, magnetic powder such as iron, sendust, ferrosilicon, permalloy, supermalloy, iron nitride, iron-aluminum alloys or iron-cobalt alloys is suitable for the core 12. Among these magnetic materials mentioned above, iron or iron-based powder compositions having high saturation magnetization is preferred when the powder is used to prepare dust cores as a substitute for the dust core prepared from silicon steel laminations currently widely employed in fan motors.

The shell 14 of the particle 10 is made from such materials as to enable the shell 14 to have an electrical resistance that is higher than that of the core 12 for the purpose of reducing the eddy current loss associated with the ferromagnetic powder. In these embodiments, the shell 14 is made of metal composites or piezoelectric materials.

As an example, the particle 10 with the core-shell structure is prepared by employing a diffusion/precipitation mechanism, based on powder sintering. Specifically, the soft magnetic material for the core 12 such as iron is melted firstly and coating material used to form the shell 14 is then added to the melted magnetic material to form a mixture. By using an atomizing or pulverization method, powder is prepared from the mixture. Then the powder is sintered at high temperature (e.g., in the range of about 300 to 900° C.) to cause the coating material contained in the powder to become supersaturated and accordingly precipitate out from the magnetic material.

The magnetic material forms as the core 12 of the particle 10 and the precipitated coating material forms as the shell 14 coated on the core 12.

In another example, the core 12 is previously obtained by, for example, an atomizing method from a soft magnetic material such as iron. A thin layer of film having high electrical resistance is then deposited on an outer surface of the core 12, wherein the film is provided as the shell 14. Such deposition method may be physical vapor deposition (PVD) or chemical vapor deposition (CVD). The material used for depositing of the film may be ferrites, piezoelectric materials, ferroelectric materials or ceramic materials.

Figure 2:
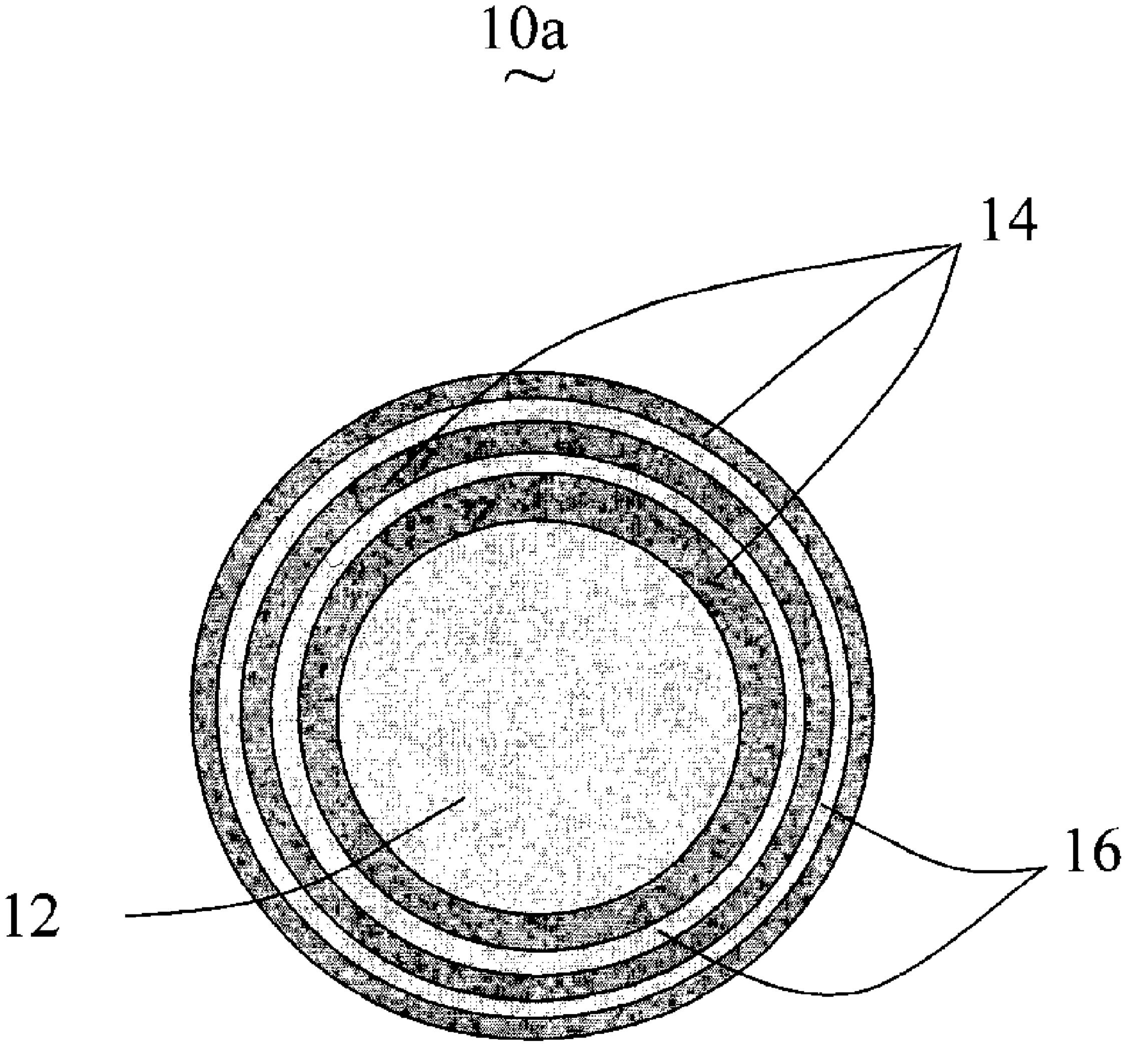
FIG. 2 is a schematic representation of a particle of the ferromagnetic powder in accordance with an alternative embodiment of the present invention.

FIG. 2 schematically illustrates another embodiment of the present invention, in which a particle 10*a* of the ferromagnetic powder has a multi-layer structure. As shown in this embodiment, the particle 10*a* includes a central core 12 and multiple layers of shells 14 concentrically surrounding the central core 12. Every two adjacent shells 14 are spaced apart by a magnetic layer 16 made of magnetic material. The outmost part of the particle 10*a* is a shell layer 14. The material for the magnetic layers 16 includes soft magnetic metals, amorphous iron-based magnetic powder, pure iron powder and composites thereof, soft magnetic non-metals and the like. In this preferred embodiment, the core 12 and the magnetic layers 16 are made of the same magnetic material.

Figure 3:
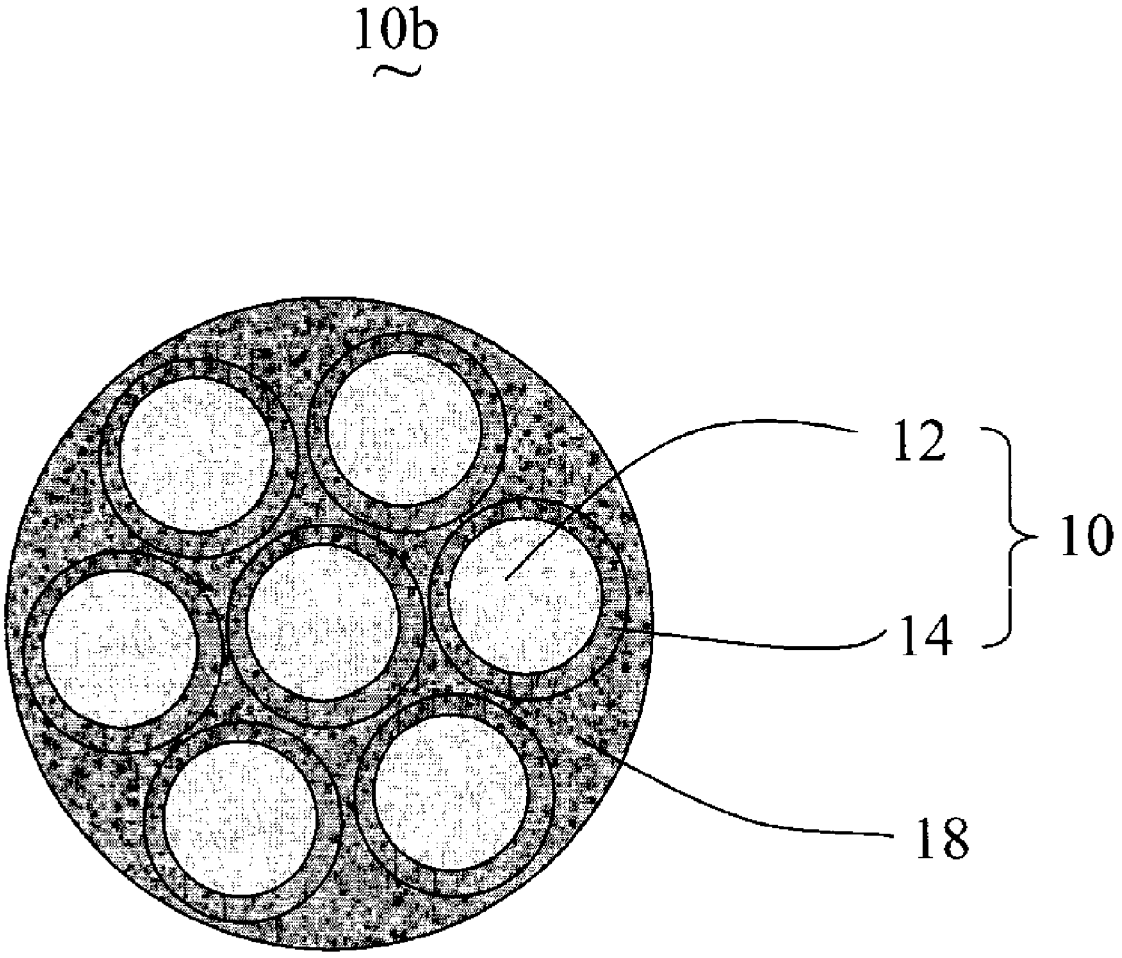
FIG. 3 is a schematic representation of a particle of the ferromagnetic powder in accordance with another embodiment of the present invention.

FIG. 3 schematically illustrates a further embodiment of the present invention, in which a particle 10*b* includes multiple particles 10 of FIG. 1 which are combined together by a binder 18 to form the particle 10*b*. Each of the elementary particles 10 includes a magnetic central core 12 and an insulation shell 14 enclosing the central core 12. In this embodiment, the binder 18 and the shell 14 are made of the same material.

The ferromagnetic powder as described above can be used to produce soft magnetic core components such as dust cores for transformers, inductors, motors, generators, and other electric/magnetic conversion devices through powder metallurgy. Powder metallurgy is a process of making parts by pressing powdered particles in die presses. A dust core can be made by pressure molding the ferromagnetic powder at a high temperature, for example, in the range of 300 to 800 centigrade degrees. After molding, the dust core can be desirably annealed to release the strain induced in the powder during the molding process in order to increase the magnetic performance thereof. The magnetic core 12 of each particle 10 of ferromagnetic powder provides the necessary magnetic property for the dust core. The shell 14 of the particle 10 operates to improve the bonding strength between the particles 10 as the ferromagnetic powder is pressure molded into the dust core. The shell 14 permits adjacent ferromagnetic particles 10 to strongly bond together, thereby increasing the mechanical performance of the dust core. Also, due to the presence of the shell 14, the insulation between the ferromagnetic particles 10 is enhanced, thereby decreasing the eddy current loss of the dust core. Therefore, the dust core made of the ferromagnetic powder as illustrated above exhibits a high magnetic flux density, low eddy current loss as well as high mechanical strength.

The dust core made from the ferromagnetic powder is suitably used as a substitute for the conventional stator core of a fan motor made from laminated steel sheets. By using the powder metallurgy process, it is possible to produce dust cores with relatively complex shapes. The use of the coated ferromagnetic particles 10 avoids the manufacturing limits in laminated steel sheets and provides a higher freedom with respect to the shape of the dust core to be formed. By using the ferromagnetic particles 10 having the core-shell structure as described above, many advantages such as improved mechanical bonding strength, reduced eddy current loss and the ability to make magnetic core components having complex shapes are achieved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A ferromagnetic powder for a magnetic core component comprising a plurality of particles, each of the particles including a central core and a shell coated on the central core, the central core being made of magnetic material and configured for providing magnetic property for the magnetic core component, the shell having a higher electrical resistance than the central core and being configured for reducing an eddy current loss of the magnetic core component and for providing a bonding strength between the plurality of particles of the powder, a material for the shell being one of piezoelectric material and ferroelectric material.

2. The ferromagnetic powder of claim 1, wherein the each of the particles is formed by a diffusion/precipitation mechanism.

3. The ferromagnetic powder of claim 1, wherein a material for the central core is soft magnetic non-metal.

4. The ferromagnetic powder of claim 1, wherein the shell is formed by depositing a thin layer of film on an outer surface of the central core.

5. The ferromagnetic powder of claim 1, wherein the each of the particles further includes another outer shell surrounding said central core and shell, and a magnetic layer sandwiched between the two shells.

6. The ferromagnetic powder of claim 1, wherein a multiple of the particles are combined together by a binder to form an integral structure, the binder surrounding all of the particles and filled between the particles.

7. A method for forming a stator core of a fan motor comprising:

preparing ferromagnetic powder comprising a plurality of particles each including at least a magnetic core and at least a shell on an outer surface of the at least a magnetic core, the at least a shell being coated on the at least a magnetic core by diffusion/precipitation mechanism, the at least a shell having a higher electrical resistance than the magnetic core; and forming the ferromagnetic powder into a desired shape of the stator core by mold pressing and heating the powder wherein the shells are heated to diffuse and bond with each other to connect the powder together.

8. The method of claim 7, wherein the each particle includes a plurality of cores and a plurality of shells on outer surfaces of the cores, respectively, and a binder binding the cores with shells together, the binder surrounding all of the shells and filled in gaps between the shells.

9. The method of claim 7, wherein the each particle further comprises a magnetic layer on the at least a shell and another shell on the magnetic layer.

10. The method of claim 7, wherein the each particle has a diameter from 5 to 150 μm.

11. The method of claim 7, wherein the ferromagnetic powder is prepared by the following steps:

melting a magnetic material;

adding a coating material into the melted magnetic material to form a mixture;

atomizing/pulverizing the mixture to obtain a plurality of raw particles; and sintering the raw particles at a temperature in a range of 300 to 900° C. to cause the coating material contained in the raw particles to become supersaturated and accordingly precipitate out from the magnetic material, thereby to obtain the particles of the ferromagnetic powder, wherein the magnetic material forms as the at least a magnetic core of the each particle and the precipitated coating material forms as the at least a shell of the each particle coated on the at least a magnetic core.

* * * * *